(12) United States Patent
Butler

(10) Patent No.: US 6,755,428 B2
(45) Date of Patent: Jun. 29, 2004

(54) PORTABLE COOLER ASSEMBLY

(75) Inventor: David L. Butler, Ravenna, OH (US)

(73) Assignee: Moeller Marine Products, Twinsburg, OH (US)

( * ) Notice: Subject to any disclaimer, the term of this patent is extended or adjusted under 35 U.S.C. 154(b) by 6 days.

(21) Appl. No.: 10/141,399

(22) Filed: May 8, 2002

(65) Prior Publication Data

US 2002/0167138 A1 Nov. 14, 2002

Related U.S. Application Data

(60) Provisional application No. 60/289,354, filed on May 8, 2001.

(51) Int. Cl.[7] .................................................. F25D 3/08
(52) U.S. Cl. ................ 280/47.26; 280/79.2; 280/47.18; 62/457.7; 224/547
(58) Field of Search ......................... 280/47.26, 47.25, 280/79.2, 63, 30, 47.18; 224/547, 548; 62/457.7, 240, 244; 294/37.6

(56) References Cited

U.S. PATENT DOCUMENTS

| 4,146,279 | A | | 3/1979 | Stahel | |
|---|---|---|---|---|---|
| 4,724,681 | A | | 2/1988 | Bartholomew et al. | |
| 4,773,709 | A | | 9/1988 | Slinkard | |
| 4,846,493 | A | | 7/1989 | Mason | |
| 5,048,639 | A | * | 9/1991 | Scherer | 182/18 |
| 5,100,198 | A | | 3/1992 | Baltzell | |
| 5,165,645 | A | * | 11/1992 | Brown | 248/310 |
| 5,228,706 | A | * | 7/1993 | Boville | 280/43.22 |
| 5,249,438 | A | * | 10/1993 | Rhaney et al. | 62/457.7 |
| 5,269,157 | A | * | 12/1993 | Ciminelli et al. | 62/457.7 |
| 5,285,656 | A | * | 2/1994 | Peters | 62/457.1 |
| 5,306,029 | A | * | 4/1994 | Kaiser, II | 280/30 |
| 5,313,817 | A | | 5/1994 | Meinders | |
| 5,373,708 | A | | 12/1994 | Dumoulin, Jr. | |
| 5,407,218 | A | * | 4/1995 | Jackson | 280/30 |
| 5,419,478 | A | * | 5/1995 | Mauro et al. | 224/276 |
| 5,423,195 | A | * | 6/1995 | Peters | 62/457.7 |
| 5,465,985 | A | | 11/1995 | Devan et al. | |
| 5,480,170 | A | * | 1/1996 | Kaiser, II | 280/30 |
| 5,683,097 | A | * | 11/1997 | Fenton et al. | 280/655.1 |
| 5,803,472 | A | * | 9/1998 | Lien | 280/47.26 |
| 5,839,738 | A | * | 11/1998 | Ozark | 280/30 |
| 6,176,499 | B1 | * | 1/2001 | Conrado et al. | 280/47.26 |
| 6,315,149 | B1 | * | 11/2001 | Conrado et al. | 220/521 |
| 6,328,179 | B1 | * | 12/2001 | Conrado et al. | 220/592.2 |
| 6,364,329 | B1 | * | 4/2002 | Holub et al. | 280/47.26 |
| 6,474,097 | B2 | * | 11/2002 | Treppedi et al. | 62/457.7 |
| 6,502,656 | B2 | * | 1/2003 | Weiss et al. | 180/168 |

* cited by examiner

*Primary Examiner*—Brian L. Johnson
*Assistant Examiner*—Jeff Restifo
(74) *Attorney, Agent, or Firm*—Howard & Howard

(57) ABSTRACT

A portable cooler assembly which can be transported along a surface and also secured to a vehicle. The cooler assembly includes an insulated container body having walls and a bottom defining a storage chamber. A lid is pivotally mounted to the container body for covering the storage chamber. A pair of wheels are each rotatably mounted to the container body for transporting the cooler assembly along the surface. A pair of retaining brackets are mounted to the vehicle. The container body abuts the retaining brackets, with the retaining brackets at least partially encompassing the walls of the container body, when the cooler assembly is secured to the vehicle. The cooler assembly also includes a pair of releasable fasteners. At least one of the walls, bottom, and lid preferably has a wheel recess with the wheels being fastened within the wheel recess when the wheels are removed from the container body.

13 Claims, 5 Drawing Sheets

//PORTABLE COOLER ASSEMBLY

RELATED APPLICATION

The subject patent application claims priority to and all the benefits of U.S. Provisional Patent Application Ser. No. 60/289,354, which was filed on May 8, 2001.

BACKGROUND OF THE INVENTION

1. Field of the Invention

The subject invention relates to a portable cooler assembly which may be transported along a surface and subsequently mounted within a vehicle.

2. Description of the Prior Art

Portable cooler assemblies having an insulated container body and a removable or hinged lid are well known in the art. Many of the coolers include wheels such that the cooler can be easily transported along a surface. The wheels, however, must be designed such that the cooler is stable and rests uniformly on the surface. One contemplated design by the prior art is to have the wheels pivot or retract to provide a uniform bottom surface for the cooler. Examples of cooler assemblies having pivoting or retracting wheels are shown in U.S. Pat. Nos. 4,846,493; 5,100,198; 5,313,817; 5,373,708; and 5,465,985.

The cooler assemblies of the prior art; however, have a number of deficiencies. First, the mechanisms for facilitating the pivoting and retracting wheels can be expensive, aesthetically displeasing, cumbersome, and prone to failure. Second, many of the pivoting wheels are relatively small in diameter which can create problems during the transportation of a fully stocked cooler over rough terrain. In addition, none of the cooler assemblies includes a device for securely holding the cooler on the surface.

Accordingly, it would be desirable to develop a cooler assembly, having wheels, which can be easily transported along a surface and subsequently secured to the surface without the wheels interfering with the stability of the cooler.

SUMMARY OF THE INVENTION AND ADVANTAGES

A portable cooler assembly adapted to be transported along a surface and adapted to be secured to a vehicle. The cooler assembly comprises an insulated container body having walls and a bottom defining a storage chamber. A lid is mounted to the container body for selectively covering the storage chamber. A pair of wheels are each rotatably mounted to the container body for transporting the cooler assembly along the surface. At least one retaining bracket is adapted to be mounted to the vehicle. The container body abuts the retaining bracket, with the retaining bracket at least partially encompassing the walls of the container body, when the cooler assembly is secured to the vehicle.

The cooler assembly also includes a pair of releasable fasteners having a mounted position rotatably securing the wheels to the container body and having a released position allowing the wheels to be removed from the container body. At least one of the walls, bottom, and lid preferably has a wheel recess with the wheels being fastened within the wheel recess when the wheels are removed from the container body.

Accordingly, the subject invention provides a wheeled cooler assembly which can be easily transported along a surface and subsequently secured to a vehicle without the wheels interfering with the stability of the cooler. In addition, the wheels of the cooler assembly are efficiently stored within a portion of the cooler itself.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
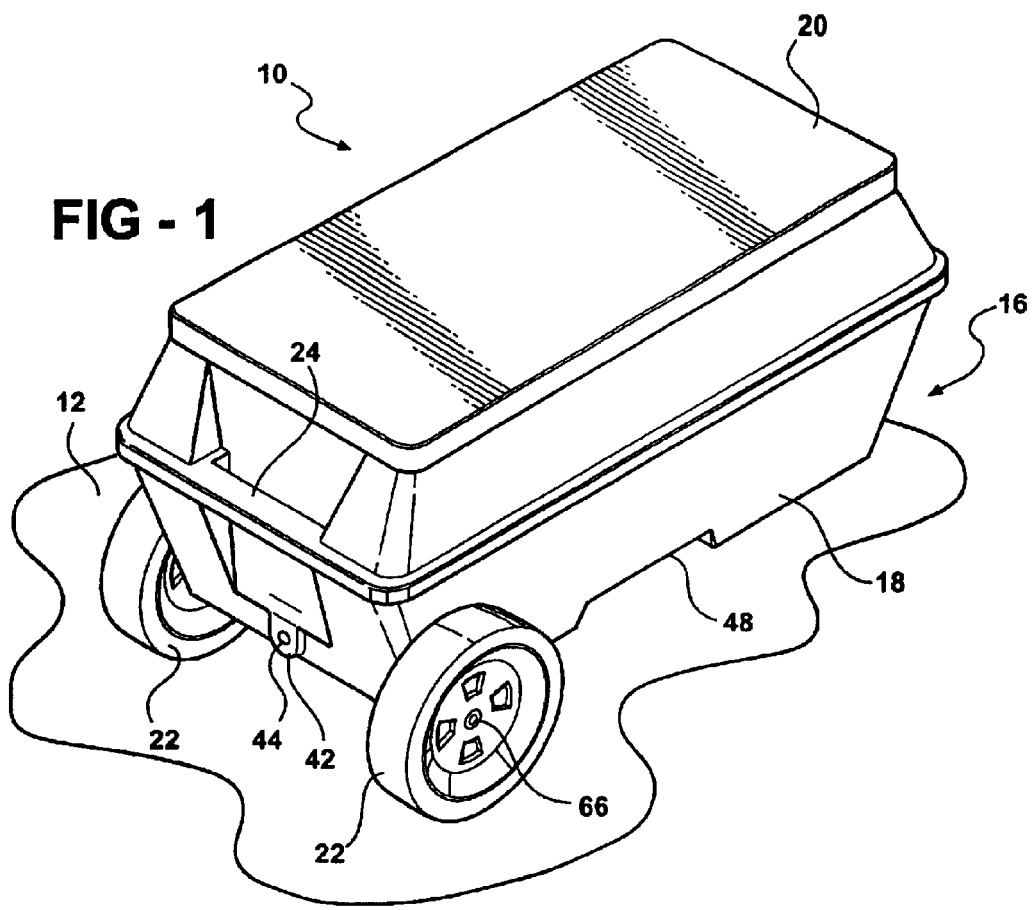
FIG. 1 is a perspective view of a portable cooler assembly in accordance with the subject invention being transported along a surface.
Figure 6:
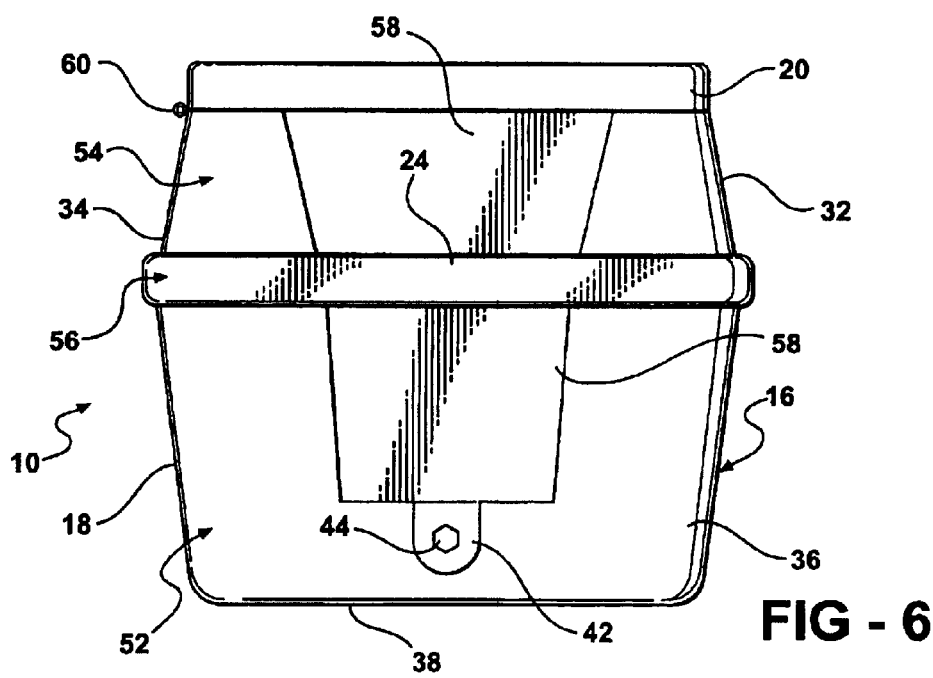
FIG. 6 is a side view of the cooler assembly.
Figure 2:
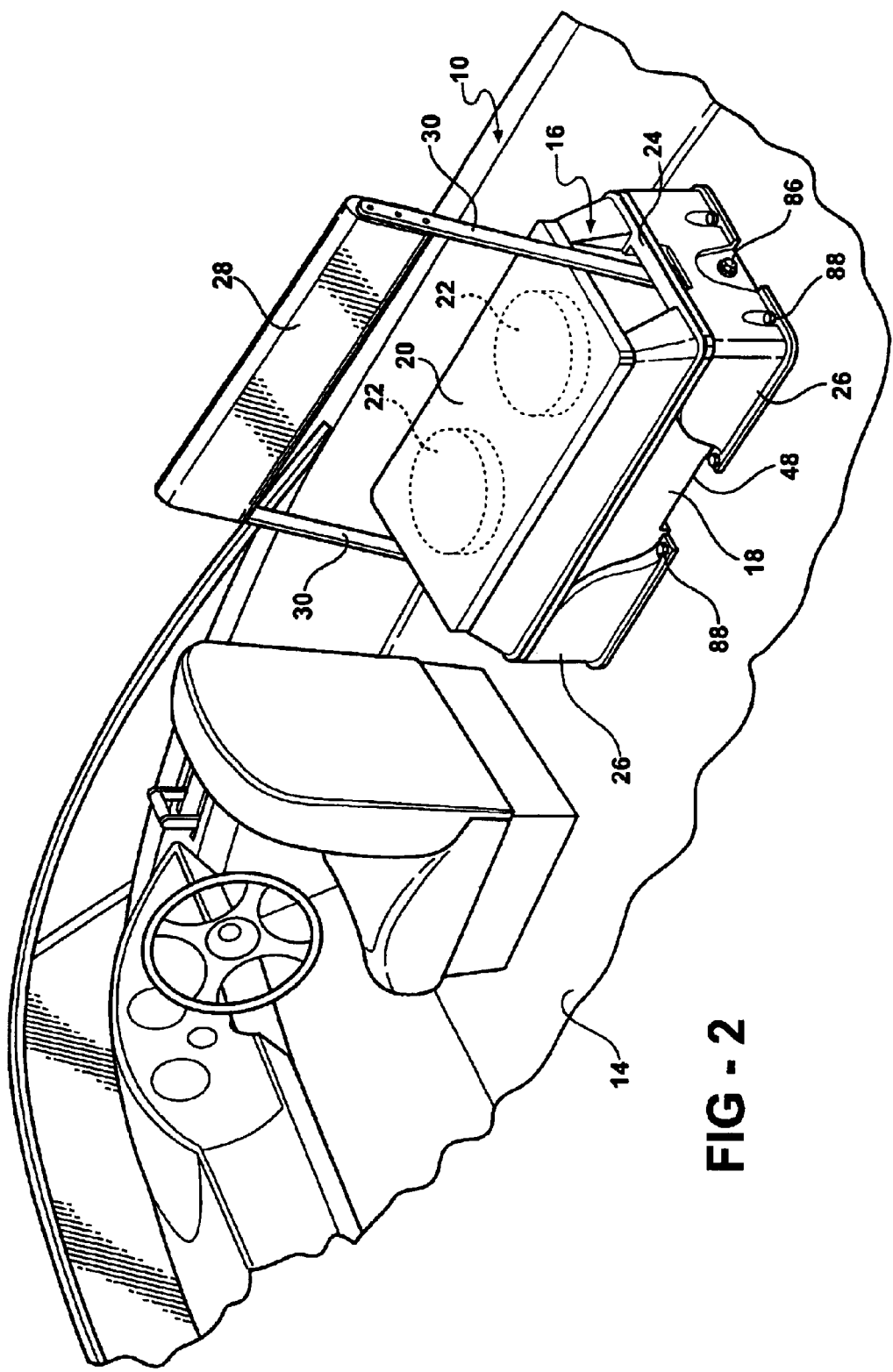
FIG. 2 is a perspective view of the cooler assembly in accordance with the subject invention mounted to a vehicle, such as a boat.

Referring to the Figures, wherein like numerals indicate like or corresponding parts throughout the several views, a portable cooler assembly, adapted to be transported along a surface 12 and adapted to be secured to a vehicle 14, is generally shown at 10 in FIGS. 1 and 2. In particular, the cooler assembly 10 is illustrated as being transported along the surface 12, such as the ground, in FIG. 1. FIG. 2 illustrates the cooler assembly 10 secured to the vehicle 14, preferably a boat.

The cooler assembly 10 comprises an insulated container body 16, having walls 18, and a lid 20. It should be appreciated that the container body 16 and lid 20 may be formed of any suitable material such as plastic or a combination of metal and plastic as known to those skilled in the art. Preferably, the container body 16 and lid 20 are formed of a common material. In addition, the lid 20 may include a padded cover for providing a level of comfort to a user sitting on the lid 20.

As shown in FIG. 1, a pair of wheels 22 are rotatably mounted to the container body 16 for transporting the cooler assembly 10 along the surface 12. Preferably, the container body 16 includes at least one handle 24 integrally formed within at least one of the walls 18 such that the cooler assembly 10 can be easily transported. As shown in FIG. 2, at least one, and preferably two, retaining brackets 26 are adapted to be mounted to the vehicle 14. The container body 16 abuts the retaining brackets 26, with the retaining brackets 26 at least partially encompassing the walls 18 of the container body 16, when the cooler assembly 10 is secured to the vehicle 14. The retaining brackets 26 therefore ensure that the cooler assembly 10 will not slide or otherwise move within the vehicle 14. As discussed in greater detail below, the wheels 22 are preferably removed from the container body 16 when the container body 16 abuts the retaining brackets 26. A seat back 28, having upstanding arms 30, can be mounted to the container body 16 and/or brackets 26 to provide back support for a user sitting on the lid 20.

Turning to FIGS. 3–6, the cooler assembly 10 is illustrated in greater detail. The walls 18 of the container body 16 are further defined as a front wall 32, a back wall 34, and opposing side walls 36. The container body 16 further includes a bottom 38, which in combination with the walls 32, 34, 36, defines a storage chamber 40. An insulating layer (not shown) may be included within the walls 32, 34, 36 and/or bottom 38 to maintain items within the storage chamber 40 at a specific temperature. At least one of the walls 32, 34, 36 includes an embossed portion 42 having a mounting hole 44 formed therein. Preferably, each of the side walls 36 includes an embossed portion 42. A partition 46 is disposed within the storage chamber 40 for dividing the storage chamber 40 into first and second halves. The bottom 38 of the container body 16 includes a channel portion 48 with a drain hole 50 formed within the bottom 38 at the channel portion 48 for each of the first and second halves.

The container body 16 can be formed of a base portion 52 and a top portion 54 each having an integral flange 56. The base 52 and top 54 portions also each include recesses 58 formed in the opposite side walls 36 which exposes a section of the integral flanges 56 to define the integral handle 24. The recesses 58 further allow access to grip the integral handle 24. It should be appreciated by those skilled in the art that the particular configuration of the container body 16 is purely illustrative and can be modified to satisfy a number of different design criteria.

Preferably, the lid 20 is pivotally mounted to the container body 16 by a pair of hinges 60 for selectively covering the storage chamber 40. At least one of the walls 32, 34, 36, bottom 38, and lid 20 have a wheel recess 62 with the wheels 22 being fastened within the wheel recess 62 when the wheels 22 are removed from the container body 16. In the most preferred embodiment, the wheel recess 62 is disposed within the lid 20. In particular, at least two separate wheel recesses 62 are formed within the lid 20 with each of the wheel recesses 62 having a configuration complementary to the wheels 22.

Figure 3:
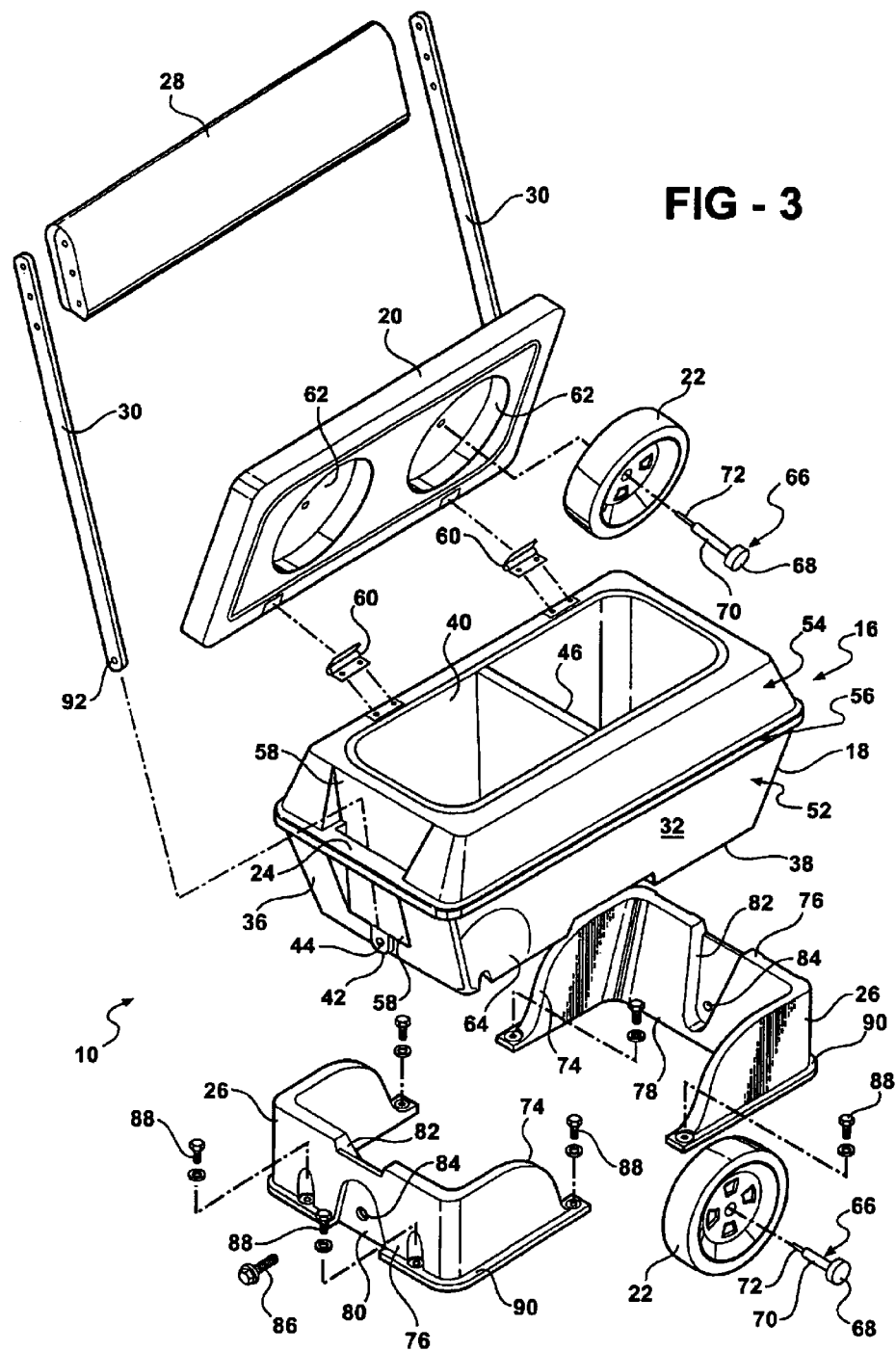
FIG. 3 is an exploded perspective view of the cooler assembly.
Figure 5:
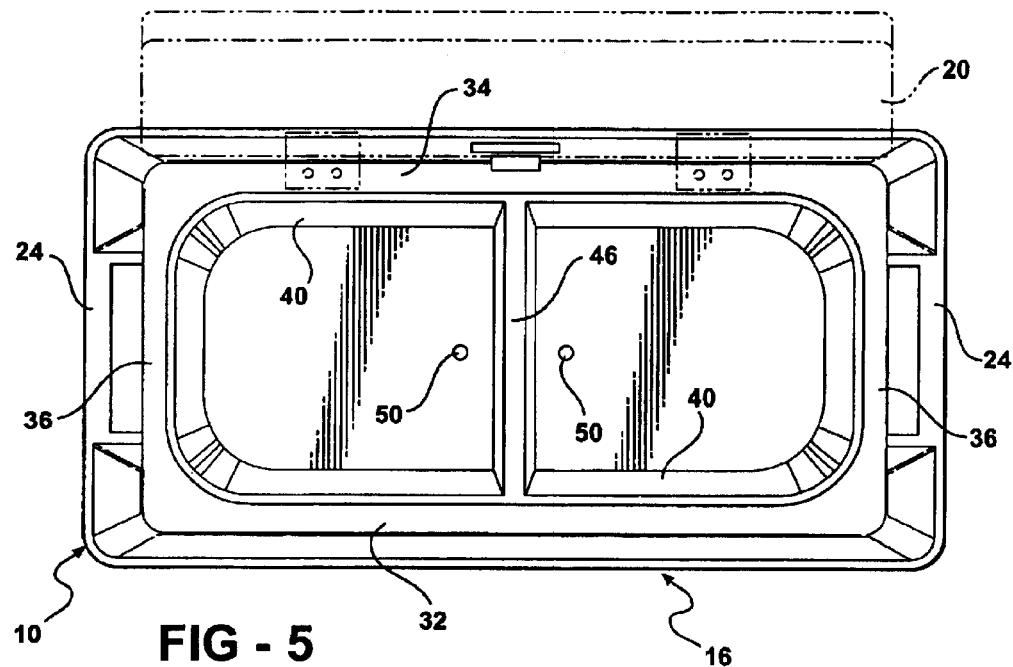
FIG. 5 is a top view of the cooler assembly with a lid in an open position.
Figure 4:
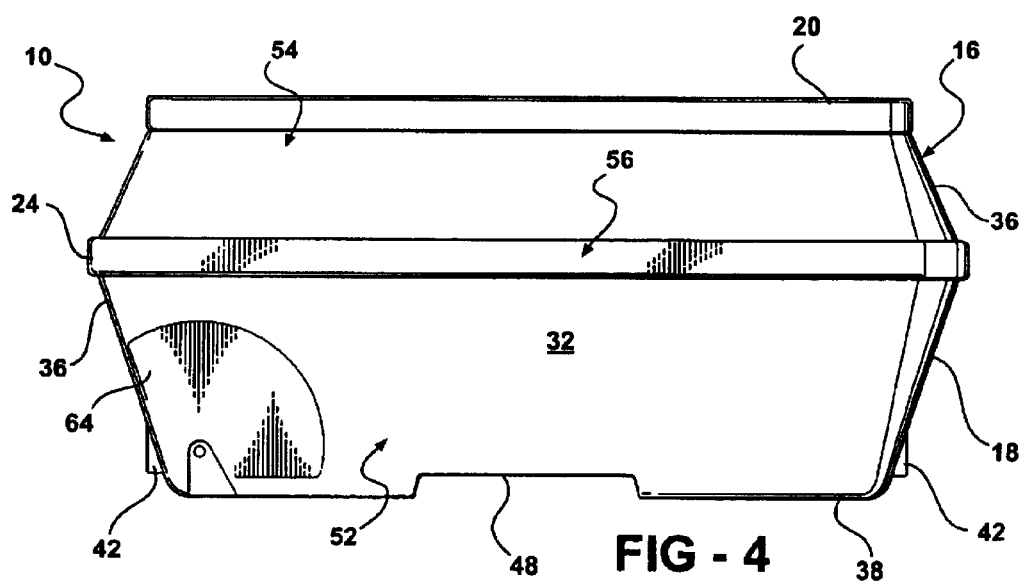
FIG. 4 is a front view of the cooler assembly.

The container body 16 further includes a pair of indentations 64 with the wheels 22 being disposed within the indentations 64 when mounted to the container body 16. As best shown in FIG. 3, a pair of releasable fasteners 66 are provided for selectively mounting the wheels 22 to the container body 16. In particular, the releasable fasteners 66 have a mounted position rotatably securing the wheels 22 to the container body 16 and a released position allowing the wheels 22 to be removed from the container body 16. The fasteners 66 preferably include a head portion 68, axle portion 70, and a threaded portion 72 with the wheels 22 rotating about the axle portion 70 when mounted to the container body 16. In the most preferred embodiment, the wheels 22 are fastened within the wheel recesses 62 of the lid 20 by the fasteners 66.

As mentioned above, the preferred embodiment includes a pair of the retaining brackets 26 disposed in opposing relationship to one another. As best shown in FIGS. 2 and 3, the retaining brackets 26 extend around a majority of a perimeter of the walls 32, 34, 36 of the container body 16 when the cooler assembly 10 is secured to the vehicle 14. Specifically, each of the opposing retaining brackets 26 is substantially U-shaped and abuts each of the front 32, back 34, and side 36 walls of the container body 16.

Figure 7:
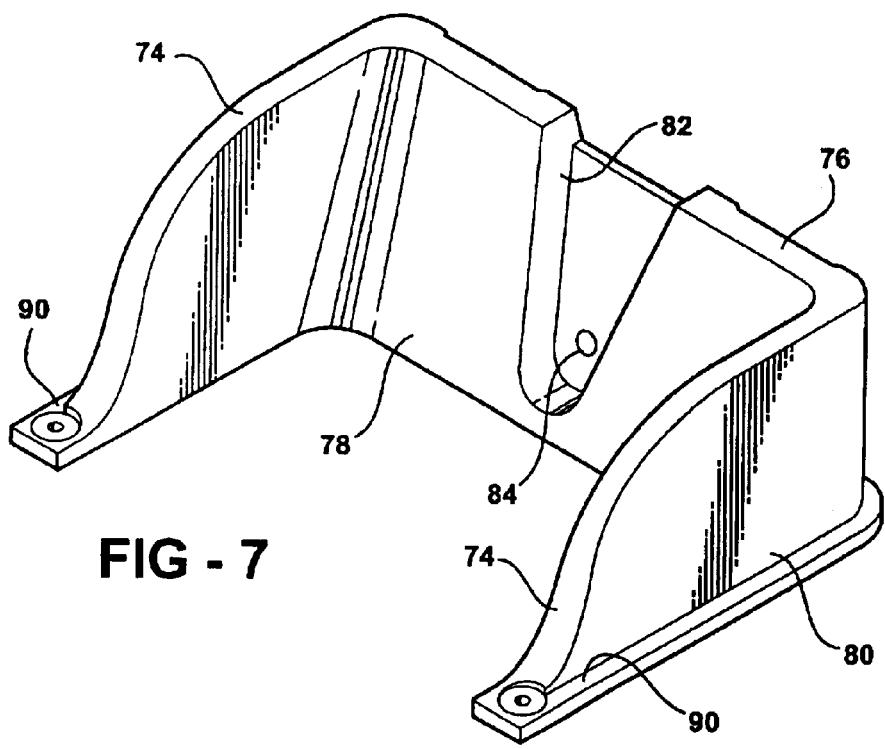
FIG. 7 is a perspective view of a bracket for securing the cooler assembly to the vehicle.
Figure 8:
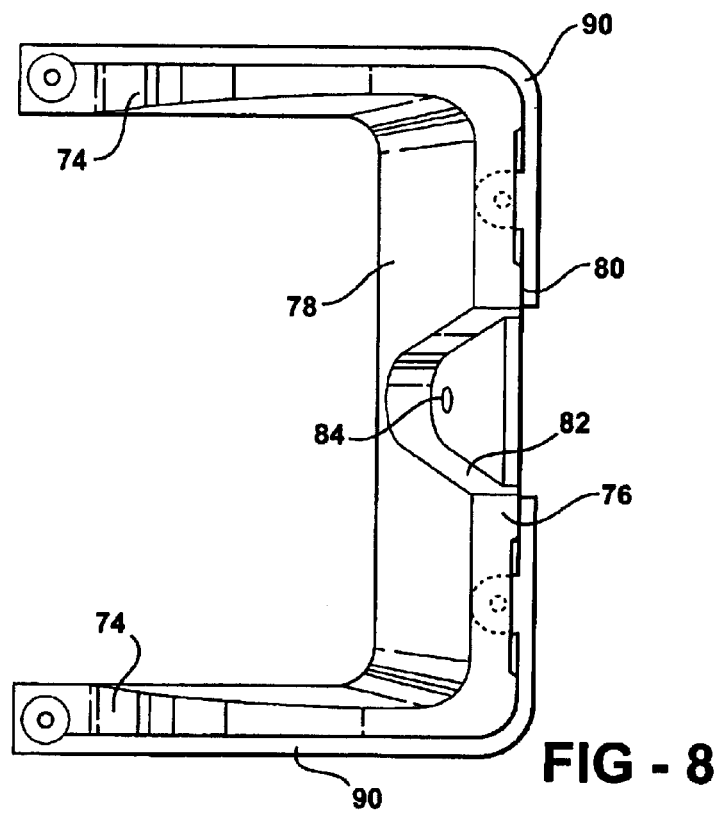
FIG. 8 is a top view of the bracket.

Referring also to FIGS. 7 and 8, each of the retaining brackets 26 includes a pair of side portions 74 integrally formed with a back portion 76 which define the U-shaped configuration. The side portions 74 have a curved section and the back portion 76 is angled outwardly away from the side portions 74. It should be appreciated that the side portions 74 and back portion 76 can be angled and configured to accept container bodies 16 having a variety of different configurations. It should also be appreciated that the retaining brackets 26 could be interconnected to form a single rectangular shaped bracket without deviating from the overall scope of the subject invention.

Each of the brackets 26 also include an inner surface 78 and an outer surface 80 with the inner surface 78 of the back portion 76 including an integral slot 82. Preferably, the slots 82 have a substantially V-shaped configuration with an aperture 84 being formed in each of the integral slots 82. The embossed portions 42 of the container body 16 align with the slots 82 of the brackets 26 and the mounting holes 44 in the embossed portions 42 align with the apertures 84 of the brackets 26 when the container body 16 abuts the brackets 26. A coupling pin 86 engages into each of the apertures 84 and the mounting holes 44 for securing the container body 16 to the brackets 26. Preferably the mounting holes 44 of the embossed portions 42 and the coupling pins 86 have corresponding threads such that the pins 86 are threadingly engaged with the container body 16.

Preferably, the embossed portions 42 and the integral handles 24 are disposed on a common wall, such as the side walls 36. Also, the arms 30 of the seat back 28 extend through the integral handles 24 and are pivotally mounted to the embossed portions 42 by the coupling pins 86 when the container body 16 is secured to the brackets 26.

The retaining brackets 26 further include at least one fastening device 88 for mounting the retaining brackets 26 to the vehicle 14. Specifically, the retaining brackets 26 each have an exterior flange 90 with at least one mounting aperture 84 formed within the flange 90 for receiving the fastening device 88.

In use, the retaining brackets 26 are permanently attached to the vehicle 14, such as the boat, by the fastening devices 88 extending through the mounting apertures 84. The cooler assembly 10, which has the wheels 22 attached thereto, is initially transported along the surface 12 from one location to another. When it is desirable to secure the cooler assembly 10 to the vehicle 14, the releasable fasteners 66 are removed from the container body 16 to their released position which allows removal of the wheels 22 from the container body 16. The wheels 22 are then, preferably, mounted to their respective wheel recesses 62 within the lid 20 utilizing the releasable fasteners 66. The container body 16 can then be placed between the brackets 26. The embossed portions 42 automatically align with the V-shaped slots 82. When the container body 16 is completely disposed within the brackets 26, the mounting holes 44 in the embossed portions 42 align with the apertures 84 of the brackets 26. The seat back 28 can be inserted, if desired, through the integral handles 24 down into the slots 82. Each of the arms 30 of the seat back 28 likewise include an aperture 92 which is also aligned with the apertures 84 of the brackets 26. The coupling pins 86 can then be inserted through the apertures 84 of the brackets 26, through the apertures 92 in the arms 30, and into the mounting holes 44 of the embossed portions 42 for securing the container body 16 and seat back 28 to the brackets 26. The cooler assembly 10 is now secured to the vehicle 14. A reverse operation may be performed to remove the cooler assembly 10 from the vehicle 14 and re-secure the wheels 22 to the container body 16.

Obviously, many modifications and variations of the present invention are possible in light of the above teachings and the invention may be practiced otherwise than as specifically described within the scope of the appended claims.

What is claimed is:

1. A portable cooler assembly adapted to be transported along a surface and adapted to be secured to a vehicle, said assembly comprising:

an insulated container body having walls and a bottom defining a storage chamber, said walls including a front wall, back wall, and opposing side walls with at least one of said walls including an embossed portion having a mounting hole formed therein;

a lid mounted to said container body for selectively covering said storage chamber;

a pair of wheels each rotatably mounted to said container body for transporting said cooler assembly along the surface; and at least one retaining bracket adapted to be mounted to the vehicle with said bracket having an inner surface and an outer surface with said inner surface including an integral slot and an aperture formed therein, said container body abutting said retaining bracket, with said retaining bracket at least partially encompassing said walls of said container body and said embossed portion aligning with said slot such that said mounting hole aligns with said aperture, when said cooler assembly is secured to the vehicle.

2. An assembly as set forth in claim 1 further including a pair of said retaining brackets disposed in opposing relationship to one another and extending around a majority of a perimeter of said walls of said container body when said cooler assembly is secured to the vehicle.

3. An assembly as set forth in claim 2 wherein said walls include a front wall, back wall, and opposing side walls with each of said opposing retaining brackets being substantially U-shaped and abutting each of said front, back, and side walls of said container body.

4. An assembly as set forth in claim 1 wherein said retaining bracket includes at least one fastening device for mounting said retaining bracket to the vehicle.

5. An assembly as set forth in claim 4 wherein said retaining bracket has an exterior flange with at least one mounting aperture formed within said flange for receiving said fastening device.

6. An assembly as set forth in claim 1 further including fasteners having mounted positions rotatably securing said wheels to said container body and having released positions allowing said wheels to be removed from said container body.

7. An assembly as set forth in claim 6 wherein said wheels are removed from said container body when said container body abuts said retaining bracket.

8. An assembly as set forth in claim 1 further including a coupling pin engageable into said aperture and said mounting hole for securing said container body to said bracket.

9. An assembly as set forth in claim 1 wherein said container body includes at least one handle integrally formed within at least one of said walls.

10. An assembly as set forth in claim 9 wherein said embossed portion and said integral handle are disposed on a common wall.

11. An assembly as set forth in claim 10 further including a seat back having upstanding arms with said arms extending through said integral handle and being pivotally mounted to said embossed portion by a coupling pin when said container body is secured to said bracket.

12. An assembly as set forth in claim 1 further including a partition disposed within said storage chamber for dividing said storage chamber into first and second halves.

13. An assembly as set forth in claim 12 wherein said bottom of said container body includes a channel portion with a drain hole formed within said bottom at said channel portion for each of said first and second halves.

* * * * *